United States Patent [19]

Hallberg

[11] Patent Number: 5,048,707

[45] Date of Patent: Sep. 17, 1991

[54] ACCORDION BREAD PAN

[75] Inventor: Linnea M. Hallberg, Auburn, Mass.

[73] Assignee: The United States of America as represented by the Secretary of the Army, Washington, D.C.

[21] Appl. No.: 436,510

[22] Filed: Nov. 13, 1989

[51] Int. Cl.$^5$ .............................................. B65D 6/00
[52] U.S. Cl. ................................. 220/4.21; 220/4.22; 220/306; 220/324; 220/671; 220/912
[58] Field of Search .................... 220/4.21, 4.22, 4.23, 220/608, 671, 912, 306, 324

[56] References Cited

U.S. PATENT DOCUMENTS

| | | | |
|---|---|---|---|
| 581,232 | 4/1897 | Hollandt | 220/4.22 |
| 2,938,649 | 5/1960 | Debs | 220/671 |
| 3,909,092 | 9/1975 | Kiernan | 220/306 X |
| 4,390,110 | 6/1983 | Pirro | 220/318 |

Primary Examiner—Stephen Marcus
Assistant Examiner—Nova Stucker
Attorney, Agent, or Firm—Richard J. Donahue; Lawrence E. Labadini

[57] ABSTRACT

A bread pan having corrugated top, bottom and side walls permits the baking of loaves having a generally accordion-like shape, such loaves being to some degree pressable without fracture. The pan has a bottom portion and a cooperating lid with the interface there between defining a seal which may be interrupted as a result of an increase of pressure within the pan to thereby release steam during baking.

1 Claim, 2 Drawing Sheets

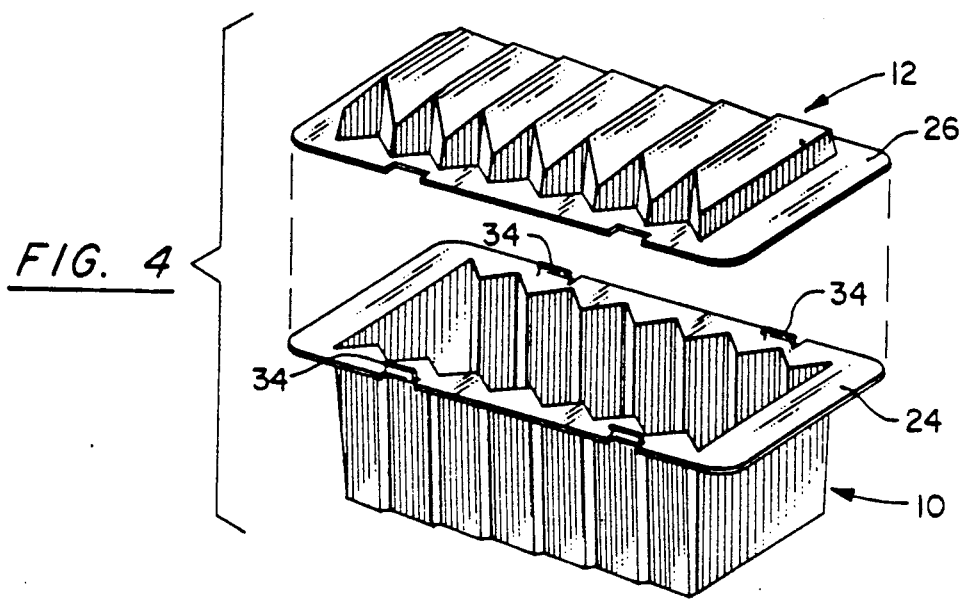
FIG. 4
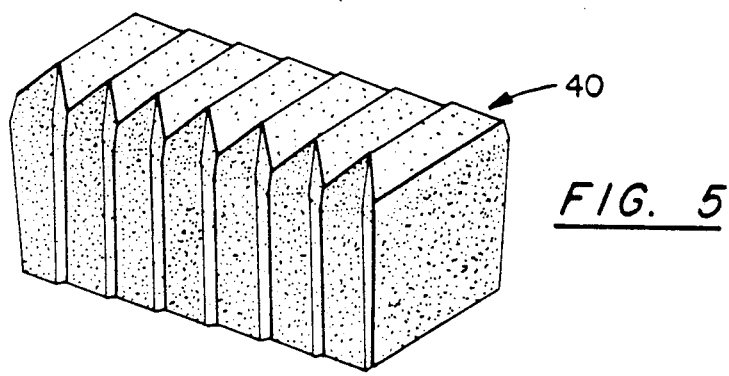
FIG. 5
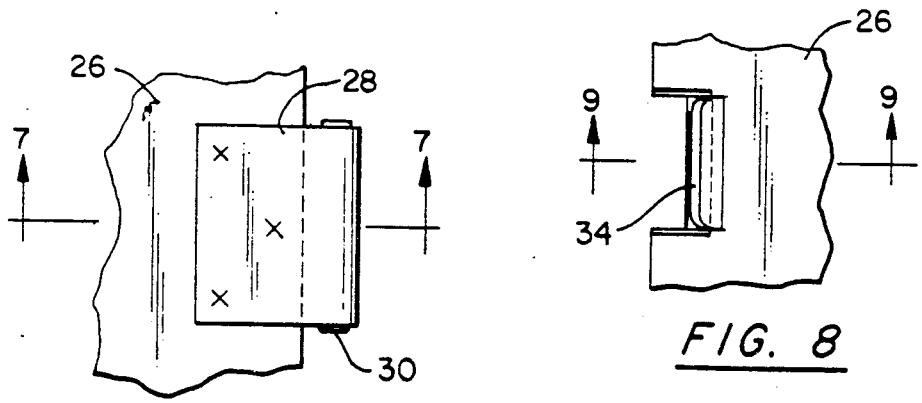
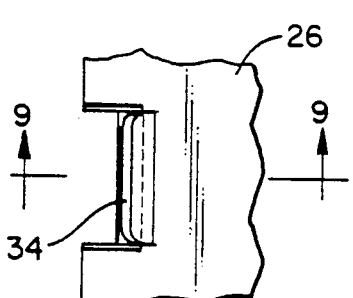
FIG. 8
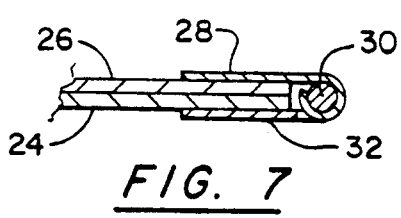
FIG. 6
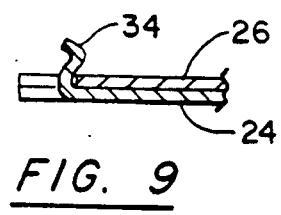
FIG. 9
FIG. 7

ACCORDION BREAD PAN

The invention described herein may be manufactured, used and licensed by or for the Government for Governmental purposes without the payment to me of any royalty thereon.

BACKGROUND OF THE INVENTION

1. Field of the Invention

The present invention relates to the preparation of bread products and particularly to the molding of bread into a form that facilitates compression without external stress fractures. More specifically, this invention is directed to a bread pan which is configured to produce loaves of bread characterized by pleated sides, top, and bottom surface suitable for volume reduction by compression. Accordingly, the general objects of the present invention are to provide novel and improved methods and apparatus of such character.

2. Description of the Prior Art

There has been a long standing desire to provide military personnel in the field with relatively fresh bread products. Bread products, however, are characterized by volumetric inefficiency. Further, bread products are notoriously fragile and, considering a loaf of bread as an example, will customarily tear when subjected to compressive forces. Such tearing or fracturing tends to make the bread unusable and accelerates deterioration. Because of the volumetric inefficiency and fragility, it has often been difficult and/or impractical to deliver relatively fresh bread products to military personnel in the field.

SUMMARY OF THE INVENTION

The present invention overcomes the above-briefly discussed and other deficiencies and disadvantages of the prior art by providing a technique for baking compressible bread products and a bread pan for use in the practice of this technique. A bread pan in accordance with the invention is configured to mold bread as it bakes into a form that facilitates compression without external stress fractures.

A bread pan in accordance with the preferred embodiment of the invention has side walls and bottom which are uniformly baffled to give an accordian-like appearance to the product produced through the use thereof. This novel bread pan is also characterized by a lid having a shape which is complimentary to the bottom, the lid mating with the remainder of the pan to form an interruptable seal about the periphery of the side walls.

BRIEF DESCRIPTION OF THE DRAWING

The present invention may be better understood and its numerous objects and advantages will become apparent to those skilled in the art by reference to the accompanying drawing wherein like reference numerals refer to like-elements in the several figures and in which:

FIG. 4 is a perspective view of the bread pan of FIG. 1 with the top raised;

FIG. 5 is a perspective view of a loaf of bread produced employing the bread pan of FIGS. 1-4;

FIG. 6 is a partial top view showing one manner of affixing the top to the bottom of a bread pan in accordance with the present invention;

FIG. 7 is a cross-sectional view taken along line 7—7 of FIG. 6;

FIG. 8 is a partial top view depicting a second manner of attaching the top to the bottom of a bread pan in accordance with the present invention;

FIG. 9 is a cross-sectional view taken along the line of 9—9 of FIG. 8.

DESCRIPTION OF THE DISCLOSED EMBODIMENTS

Figure 1:
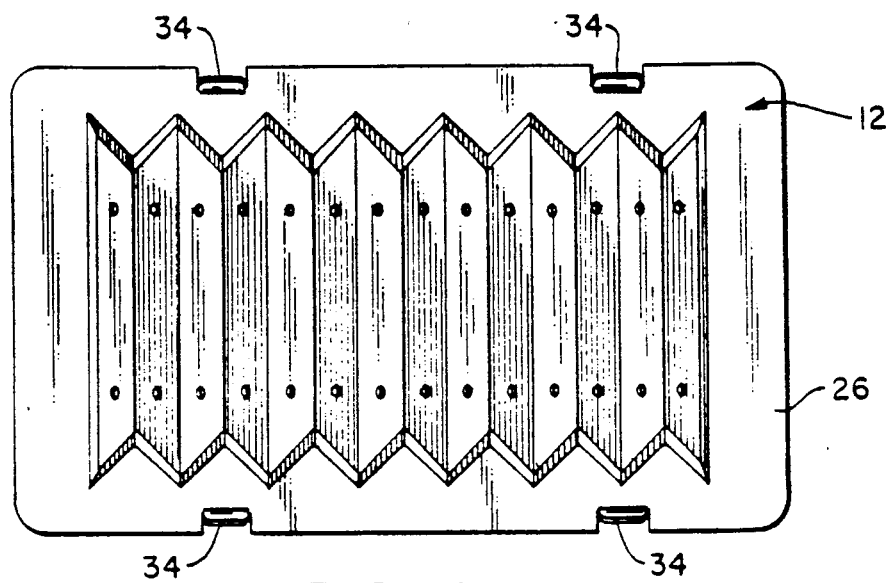
FIG. 1 is a top view of a bread pan in accordance with a first embodiment of the invention.
Figure 2:
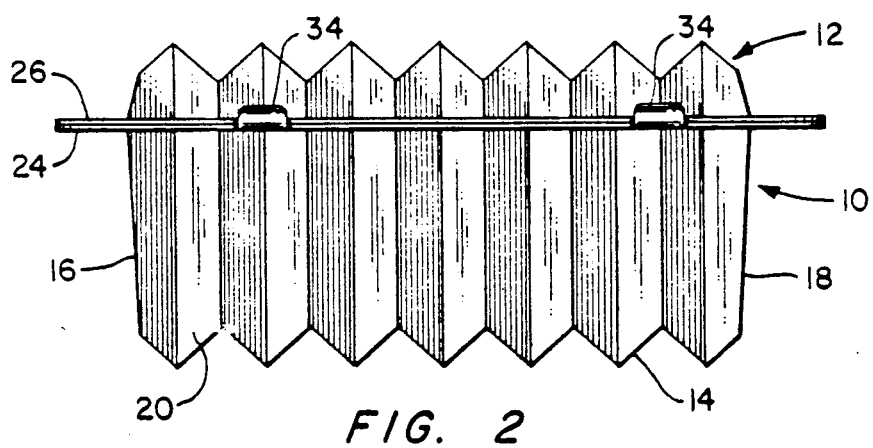
FIG. 2 is a side elevational view of the bread pan of FIG. 1.
Figure 3:
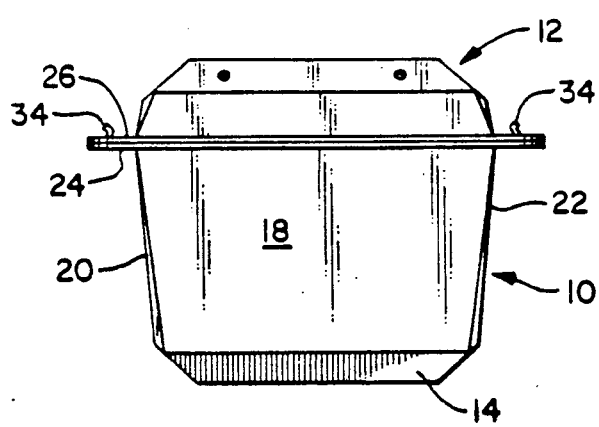
FIG. 3 is an end elevational view of the bread pan of FIG. 1.

With reference now to the drawing, a bread pan in accordance with the present invention generally comprises a bottom portion 10 and a top portion 12. The bottom portion 10 of the pan is defined by a bottom wall 14, a pair of oppositely disposed end walls 16 and 18 and a pair of oppositely disposed side walls 20 and 22. The side walls 20 and 22 and the bottom wall 14 of bottom portion 10 of the pan are corrugated as shown. The oppositely disposed end walls 16 and 18 are flat and, as best seen from FIG. 2, diverge slightly as they extend upwardly from the bottom 14. A flat rim 24 extends outwardly and is contiguous with the top of the side and end walls.

As will be described is greater detail below in the discussion of FIGS. 6-9, the rim 24 is provided with cut-outs which are folded upwardly and shaped to define portions of latches and/or hinges for engaging the top 12.

The top or lid 12, as best shown in FIG. 4, generally mirrors the shape of the bottom portion 10 of the pan. The side and end walls of the corrugated portion of the top are typically of considerably less height when compared to the bottom. The rim portion 26 of the top is provided with notches and/or hinge-defining projection which coooporate with latches/hinge elements on the rim 24 of the bottom of the pan to secure the top to the bottom during the baking of bread while simultaneously permitting easy opening and/or removal of the top.

Referring to FIGS. 6 and 7, the top 12 may be connected by hinges to the bottom 10 of a bread pan in accordance with the invention is shown. In this embodiment, a pair of hinge-defining plate members 28 are attached, in any suitable manner to the rim 26 of the top 12. The members 28 cooporate, via hinge pins 30, with hinge-defining plates 32 affixed in any suitable manner to the flange or rim 24 of the bottom 10 of the pan.

Referring to FIGS. 8 and 9, latch mechanisms for retaining the top 12 on the bottom 10 and for holding the top in the closed position during the baking are depicted. It is to be understood that, when the hinge arrangement of FIGS. 6 and 7 is employed, there will typically be a latch of the type of FIGS. 8 and 9 disposed oppositely with respect to each hinge. However, if the top is not to be hinged to the bottom, the latches as depicted in FIGS. 8 and 9 may be employed at multiple locations at each of a pair of opposite side of a top and bottom as depicted in FIGS. 1-4. The latches comprise folded over and shaped resilient fingers 34 which are integral with, i.e., formed from cut-outs made the rim 24 of the pan bottom. The rim 26 of the pan top is provided with notches which received the fingers 34 thus permitting the top to be snapped into position. The top may subsequently be removed or pivoted simply by applying outwardly directed force to a pair of the fingers 34 located on the same side of the pan. When the top is installed, it defines a non-hermetic joint or seal which allows the escape of steam during the baking process.

It will be understood that the top and bottom of a bread pan in accordance with the present invention will be comprised of the same metal, typically aluminum and that the pan may have a non-stick coating, such as "Teflon".

FIG. 5 depicts a loaf of bread 40 produced through the use of a bread pan in accordances with the invention. Because of the configuration imparted to the loaf 40 by the corrugations in the top, bottom and side walls of the pan bottom and top, the loaf 40 can to some extend be compressed to decrease its volume without fracture. As a side benefit, the corrugations increase the surface area of the pan so that large loaves of bread will bake more quickly. As a further benefit of the use derived from a bread pan in accordance with the invention, the corrugations define guide lines for slicing a loaf subsequent to expansion as will occur, upon removal of a wrapper for example, into uniform slices or portions.

While preferred embodiments have been shown and described, various modifications and substitutions may be made thereto without departing the spirit and scope of the invention. Accordingly, it is to be understood that the present invention has been described by way of illustration and not limitation.

What is claimed:

1. A bread pan comprising:
   a bottom member, said bottom member having a bottom wall, a pair of opposed end walls, and a pair of opposed side walls, the end walls and the side walls of said bottom member extending outwardly from the bottom wall of said bottom member, the bottom wall and the side walls of said bottom member being provided with aligned corrugations comprising flat surfaces that extend between roots and apexes of consecutive corrugated sections, the bottom wall, the end walls and the side walls of said bottom member cooperating to define a dough-receiving recess, the edges of the side walls and end walls of said bottom member disposed opposite the bottom wall of said bottom member defining a plane, said bottom member having a rim of generally rectangular periphery extending outwardly from said plane-defining edges of said end walls and said walls of said bottom member,
   a lid which cooperates with said bottom member to define a closed baking chamber, said lid having a top wall, a pair of opposed end walls, and a pair of opposed side walls, the end walls and the side walls of said lid extending outwardly from the top wall of said lid, the top wall and the side walls of said lid being provided with aligned corrugations comprising flat surfaces that extend between roots and apexes of consecutive corrugated sections, the edges of the side walls and end walls of said lid disposed opposite the top wall of said lid defining a plane, said lid having a rim of generally rectangular periphery extending outwardly from said plane-defining edges of said end walls and said side walls of said lid, said rim being generally complimentary in shape to the rim of said bottom member,
   and retaining means associated with the rim of said bottom member and the rim of said lid for retaining said lid on said bottom member during baking, said retaining means comprising resilient fingers projecting from one of said rims which engage cutouts formed in the other of said rims.

* * * * *